(12) United States Patent
Bonnett et al.

(10) Patent No.: US 7,649,982 B2
(45) Date of Patent: Jan. 19, 2010

(54) NETWORK-TEST SYSTEM AND METHOD USING SCRIPT COMMAND IN A SERVER TO EMULATE A TTY DEVICE AND DEFINE A TTY TEST CASE

(75) Inventors: Brian Bonnett, Dallas, TX (US); Craig E. Newman, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 425 days.

(21) Appl. No.: 11/611,529

(22) Filed: Dec. 15, 2006

(65) Prior Publication Data

US 2008/0144780 A1 Jun. 19, 2008

(51) Int. Cl.
*H04M 1/24* (2006.01)

(52) U.S. Cl. .................. 379/10.03; 379/10.01; 703/23; 703/26; 709/246

(58) Field of Classification Search .................. 703/13, 703/23, 26; 379/52, 10.03, 10.01; 370/298; 375/259; 709/246
See application file for complete search history.

(56) References Cited

U.S. PATENT DOCUMENTS

| 6,434,198 B1 * | 8/2002 | Tarraf ......................... 375/259 |
| 6,961,320 B1 * | 11/2005 | Swaminathan et al. ...... 370/298 |
| 6,965,664 B1 * | 11/2005 | McIntosh et al. ............. 379/52 |
| 2005/0137838 A1 * | 6/2005 | Medlyn ....................... 703/13 |

* cited by examiner

*Primary Examiner*—Le Luu

(57) ABSTRACT

A device translates a script command related to teletype (TTY) communications in a network, and generates or receives a TTY signal based on the translated script to test the network.

23 Claims, 6 Drawing Sheets

NETWORK-TEST SYSTEM AND METHOD USING SCRIPT COMMAND IN A SERVER TO EMULATE A TTY DEVICE AND DEFINE A TTY TEST CASE

BACKGROUND INFORMATION

An electronic device (e.g., a telecommunications device for the deaf (TDD) or a teletype (TTY) device) for text communication, via a telephone line, may be used if one or more parties has hearing or speech difficulties. A TTY device may permit the hearing impaired to communicate with different services using a visual display and a keyboard instead of audio input and output. A typical TTY device may transmit text live, e.g., via telephone lines, to a compatible device using a similar communication protocol. There may be several different communication protocols used by a TTY device. For example, in the United States, a Baudot code protocol may be used asynchronously at various baud rates (e.g., "45.5" or "50" baud) and various bit rates (e.g., "1" start bit, "5" data bits, and/or "1.5" stop bits). Other protocols may include Dual-tone multi-frequency (DTMF), V.21, V.23, etc.

Testing of TTY devices typically is a manual and time consuming task. Unlike conventional telephones which may be emulated during testing of network functions, current networks fail to provide such emulation for TTY devices.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide systems and methods that use a mechanism emulating a TTY device to permit TTY functional testing of a network and/or devices within the network. The systems and methods may implement the mechanism within an interactive testing platform (ITP) system that may test the performance of the network. The mechanism may generate sound using two different frequencies to represent binary "1s" and "0s." The sounds may be generated at a predetermined rate and with different patterns (e.g., frequencies) to represent different characters in the alphabet.

Figure 1:
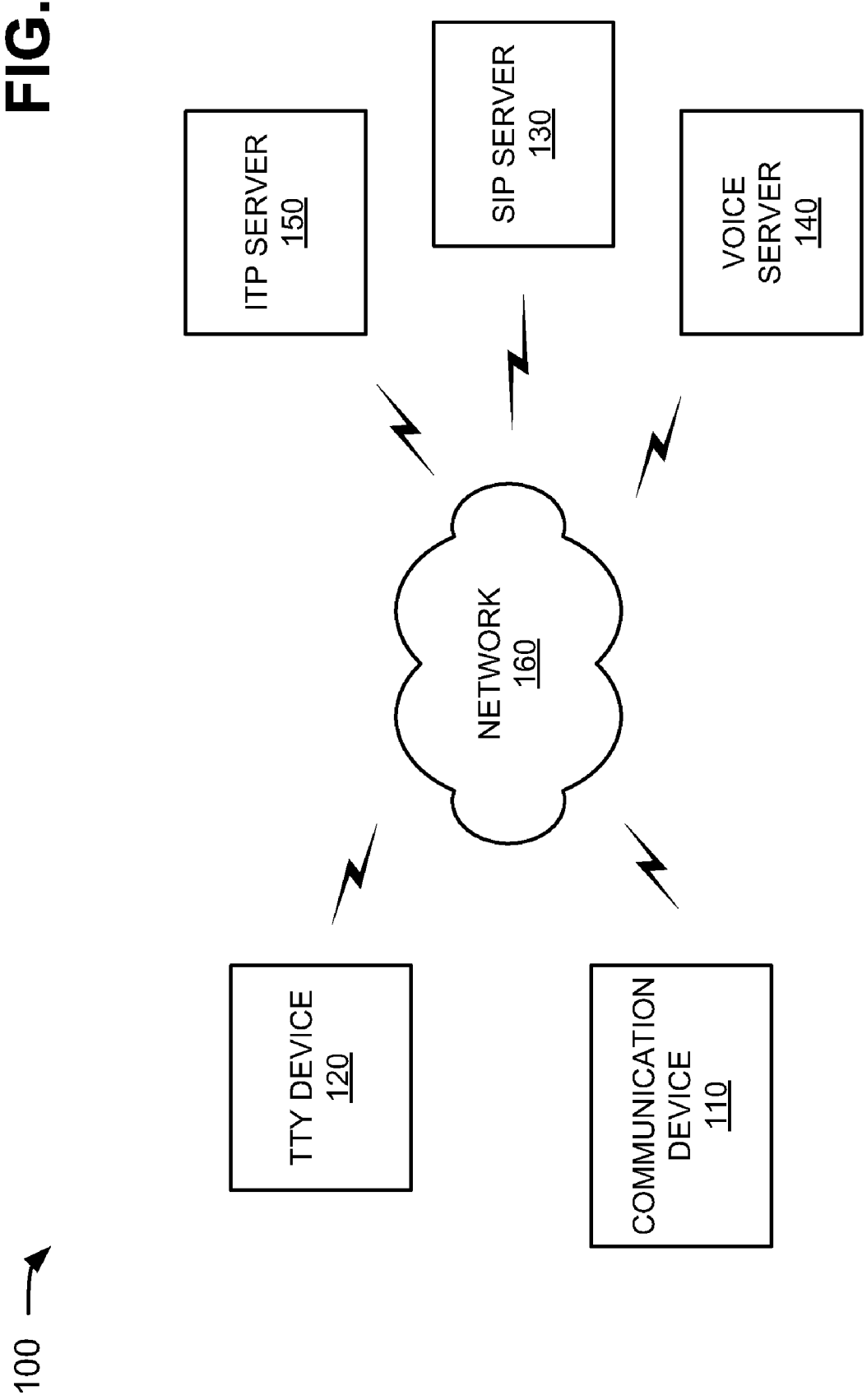
FIG. 1 depicts an exemplary network in which systems and methods described herein may be implemented.

FIG. 1 is a diagram of an exemplary network 100 in which systems and methods described herein may be implemented. Network 100 may include a communication device 110 and a TTY device 120 connected to multiple servers (e.g., a Session Initiation Protocol (SIP) server 130, a voice server 140, and an ITP server 150) via a network 160. Network 160 may include a local area network (LAN), a wide area network (WAN), a telephone network, such as the Public Switched Telephone Network (PSTN), an intranet, the Internet, or a combination of networks.

Communication device 110, TTY device 120, and servers 130-150 may connect to network 160 via wired, wireless, and/or optical connections. One communication device 110, one TTY device 120, and three servers 130-150 have been illustrated as connected to network 160 for simplicity. In practice, there may be more or fewer communication devices, TTY devices, and servers. Also, in some instances, a communication device may perform one or more functions of a server and/or a server may perform one or more functions of a communication device. In other instances, a TTY device may perform one or more functions of a server and/or a server may perform one or more functions of a TTY device.

Communication device 110 may include a device, such as an ITP client device, a personal computer, a SIP telephone, a wireless telephone, a personal digital assistant (PDA), a laptop, or another type of computation or communication device, a thread or process running on one of these devices, and/or an object executable by one of these devices. In one implementation, for example, communication device 110 may include the features set forth in co-pending application Ser. No. 11/611,582, entitled "AUTOMATED SESSION INITIATION PROTOCOL (SIP) DEVICE," filed on the same date herewith, the disclosure of which is incorporated by reference herein in its entirety.

TTY device 120 may include a device, such as a TDD, a device for text communication via a telephone line, a device used to communicate with different services (e.g., provided by network 160) using a visual display and a keyboard instead of audio input and output, or another type of computation device, a thread or process running on one of these devices, and/or an object executable by one of these devices. Additional details of TTY device 120 are provided below in connection with FIG. 3.

SIP server 130, also commonly referred to as a network server, may include a device that facilitates the establishment of SIP calls. A "SIP call," as the term is used herein, is to be broadly interpreted to include any out-of-dialog or dialog-establishing SIP method (e.g., a SIP INVITE request, a SIP SUBSCRIBE request, a SIP REFER request, a SIP OPTIONS request, a SIP MESSAGE request, a SIP REGISTER request, etc.). SIP server 130 may act as both a server and a client for the purpose of making requests on behalf of other clients. Requests may be serviced internally or by passing them on, possibly after translation, to other servers. SIP server 130 may interpret, and, if necessary, rewrite a request message before forwarding it.

Voice server 140 may include server entities that are capable of facilitating network-based communications, e.g., telephone calls, Internet-based telephone calls, multimedia distribution, multimedia conferences, instant messaging conferences, interactive voice response (IVR), automated and manual operator services, automatic call distribution, call routing, etc.

ITP server 150 may include server entities that may provide a mechanism emulating a TTY device to permit TTY functional testing of a network and/or devices within the network. For example, ITP server 150 may generate sound using two different frequencies to represent binary "1s" and "0s," may generate sound at a predetermined rate and with different patterns (e.g., frequencies) to represent different characters in the alphabet, may emulate a TTY device, may evaluate the results of the emulated TTY device, etc. Additional details of ITP server 150 are provided below in connection with FIG. 4.

In one example, ITP server 150 may control tests designed to exercise network devices such as TTY device 120. ITP server 150 may communicate with network 160 to perform the tests and may present the resulting information to a user. ITP server 150 may permit a user to edit and/or view the executable content of the test cases through a user interface, as well as define and edit scripts for the test cases. The test cases may include a defined purpose and a script that controls execution of the test over network 160. The script, for example, may contain commands to initiate TTY communications over network 160. The script commands may enable construction of messages (e.g., TTY communications) and may permit call control that may resemble live network traffic.

In another example, ITP server 150 (or in cooperation with other ITP servers or other devices) may execute script defined for a test case. ITP server 150 may perform several operations when it receives a script execution request. ITP server 150 may retrieve the script from a database, and may report any problems retrieving the script from the database. ITP server 150 may extract data origination and termination resources defined by the test case. ITP server 150 may connect with voice server 140 to allocate the defined resources. ITP server 150 may also connect to hardware servers using the resource information acquired from voice server 140. The method by which the script uses the applicable resources may affect the resource configuration (e.g., resources used to originate calls may be configured differently from those used to terminate calls). If resources are available to ITP server 150 for real-time control, ITP server 150 may execute the script and continue until a result has been reached, at which point connections to the hardware servers may be terminated, the allocated resources may be freed in voice server 140, and the test results may be generated by ITP server 150. Throughout this process, data elements may be passed from ITP server 150 to an ITP client device (e.g., communication device 110) in order to update the user regarding the tests in progress.

Although FIG. 1 shows exemplary components of network 100, in other implementations, network 100 may contain fewer or additional components that may permit network testing. In still other implementations, one or more components of network 100 may perform the tasks performed by other components of network 100.

While servers 130-150 are shown as separate entities, it may be possible for one or more of servers 130-150 to perform one or more of the functions of another one or more of servers 130-150. For example, it may be possible that two or more of servers 130-150 are implemented as a single server. It may also be possible for a single one of servers 130-150 to be implemented as two or more separate (and possibly distributed) devices.

Although implementations are described below in the context of a network that supports TTY devices (e.g., using Baudot code, DTMF, V.21, V.23, etc. communication protocols), in other implementations, equivalent or analogous communication protocols (e.g., SIP, Internet-Protocol (IP)-based, International Telecommunication Union (ITU) H.323, ITU Signaling System 7 (SS7), integrated services digital network (ISDN), Inband, etc.) and/or types of transport networks (e.g., asynchronous transfer mode (ATM), frame relay, etc.) may be used. Both the ITU H.323 standard and the IETF's SIP are examples of protocols that may be used for establishing a communications session among terminals, such as communication device 110, connected to a network.

Although TTY-type messages are shown for convenience, any type of protocol or a mixture of such protocols may be applied in various parts of the overall system.

Figure 2:
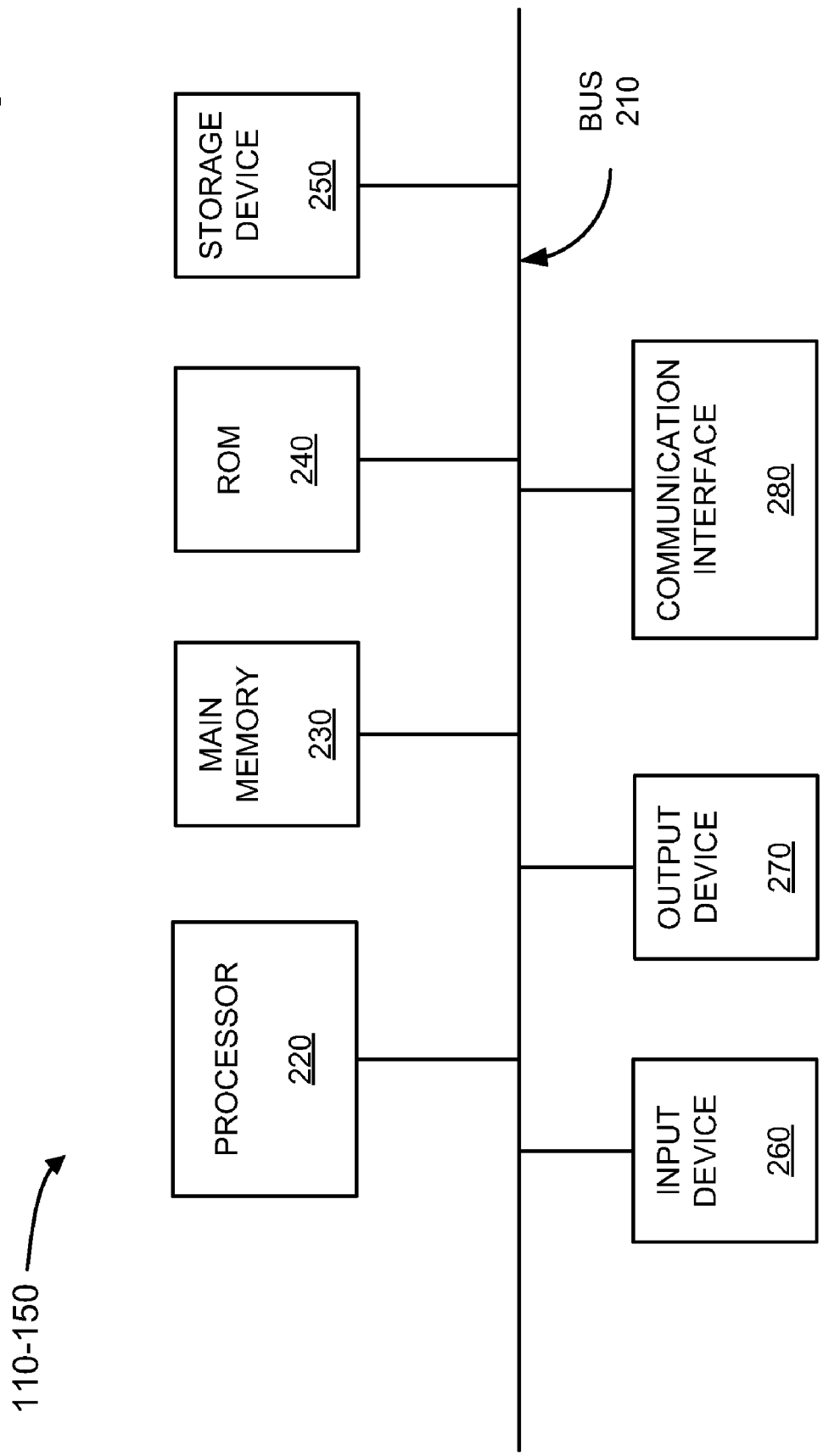
FIG. 2 depicts an exemplary device, client or server, configured to communicate via the exemplary network of FIG. 1.

FIG. 2 is an exemplary diagram of a client or server entity (hereinafter called "client/server entity"), which may correspond to one or more of communication device 110, TTY device 120, or servers 130-150. The client/server entity may include a bus 210, a processor 220, a main memory 230, a read only memory (ROM) 240, a storage device 250, an input device 260, an output device 270, and a communication interface 280. Bus 210 may include a path that permits communication among the elements of the client/server entity.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information into the client/server entity, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 160.

As will be described in detail below, the client/server entity may perform certain operations. The client/server entity may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of the client/server entity, in other implementations, the client/server entity may contain fewer or additional components. In still other implementations, one or more components of the client/server entity may perform the tasks performed by other components of the client/server entity.

Figure 3:
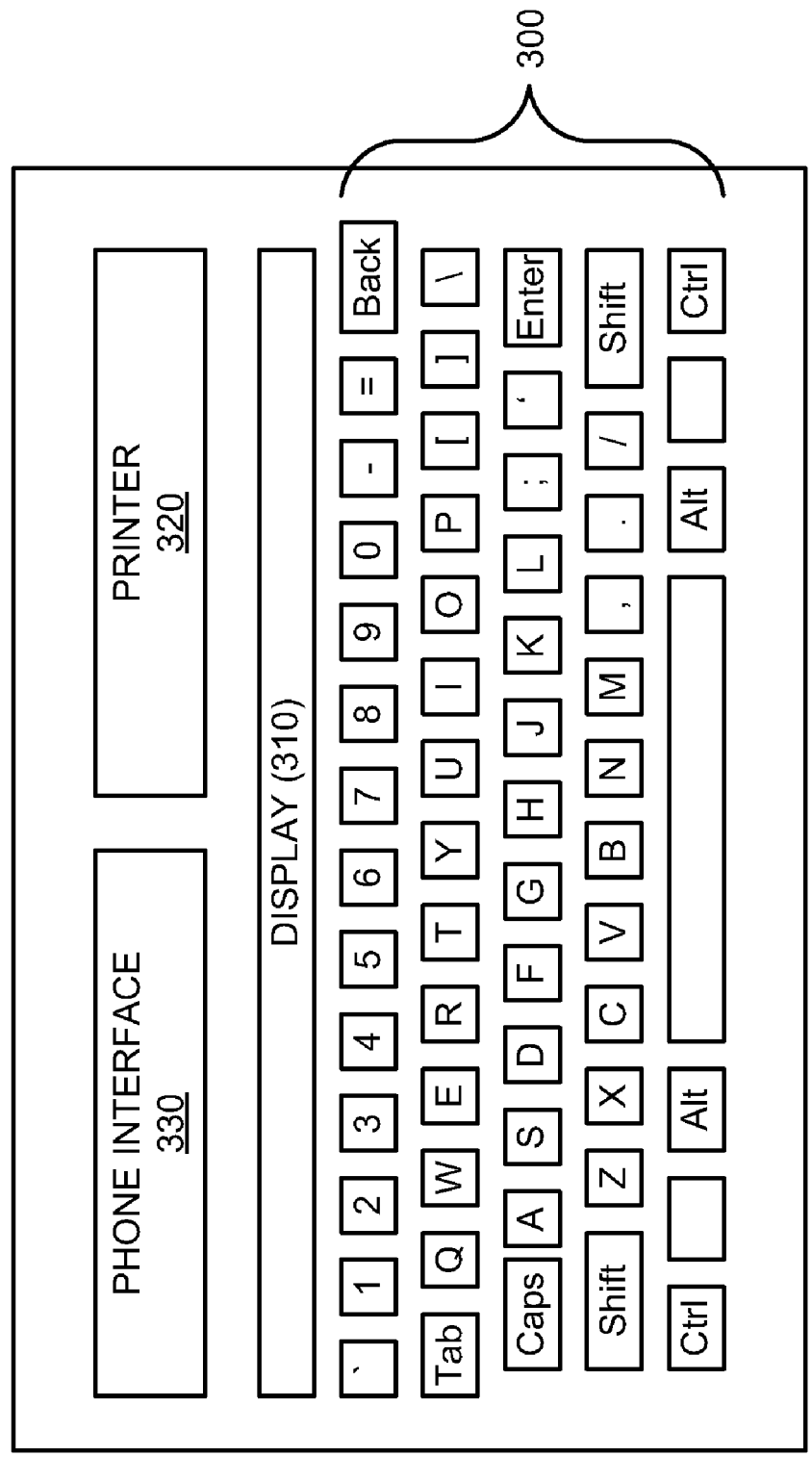
FIG. 3 is an exemplary diagram of a TTY device of the exemplary network shown in FIG. 1.

FIG. 3 is an exemplary diagram of TTY device 120 of exemplary network 100. As shown, TTY device 120 may include a variety of components, including, e.g., a QWERTY keyboard 300, a display 310, a printer 320, and/or a phone interface 330. Keyboard 300 may include a mechanism that permits an operator (e.g., a hearing impaired operator) to input information into TTY device 120. TTY device 120 may include other input mechanisms, such as a mouse, a pen, voice recognition and/or biometric mechanisms, etc.

Display 310 may provide visual information to the user. For example, display 310 may provide information regarding text input via keyboard 300, incoming text provided by another TTY device, etc. In one example, display 310 may use laser-emitting diodes (LEDs) or a liquid crystal display (LCD) screen to display information.

Printer 320 may provide visual information to the user. For example, printer 320 may include a device capable of providing a print out of text input via keyboard 300, incoming text provided by another TTY device, etc. In one example, printer 320 may include a spool of paper on which text is printed.

Phone interface 330 may provide a mechanism for connecting a communication device (e.g., a telephone) or a handset of a communication device to TTY device 120. For example, phone interface 330 may include an interface or interfaces capable of connecting with various types of communication devices.

Although FIG. 3 shows exemplary components of TTY device 120, in other implementations, TTY device 120 may include fewer or additional components that may permit TTY communication via a network, such as network 160. Moreover, as indicated above with respect to FIG. 2, TTY device 120 may include a processor and a memory.

An ITP system may include several servers that may interoperate in the execution of testing network 160 for TTY functionality (e.g., a script server that may create script, a script execution server that may execute script, voice server 140, etc.). In one implementation, the ITP system may include the features set forth in co-pending application Ser. No. 11/611,605, entitled "AUTOMATED AUDIO STREAM TESTING," filed on the same date herewith, the disclosure of which is incorporated by reference herein in its entirety. In another implementation, the ITP system may include the features set forth in co-pending application Ser. No. 11/611,560, entitled "DISTRIBUTED VOICE QUALITY TESTING," filed on the same date herewith, the disclosure of which is incorporated by reference herein in its entirety.

Figure 4:
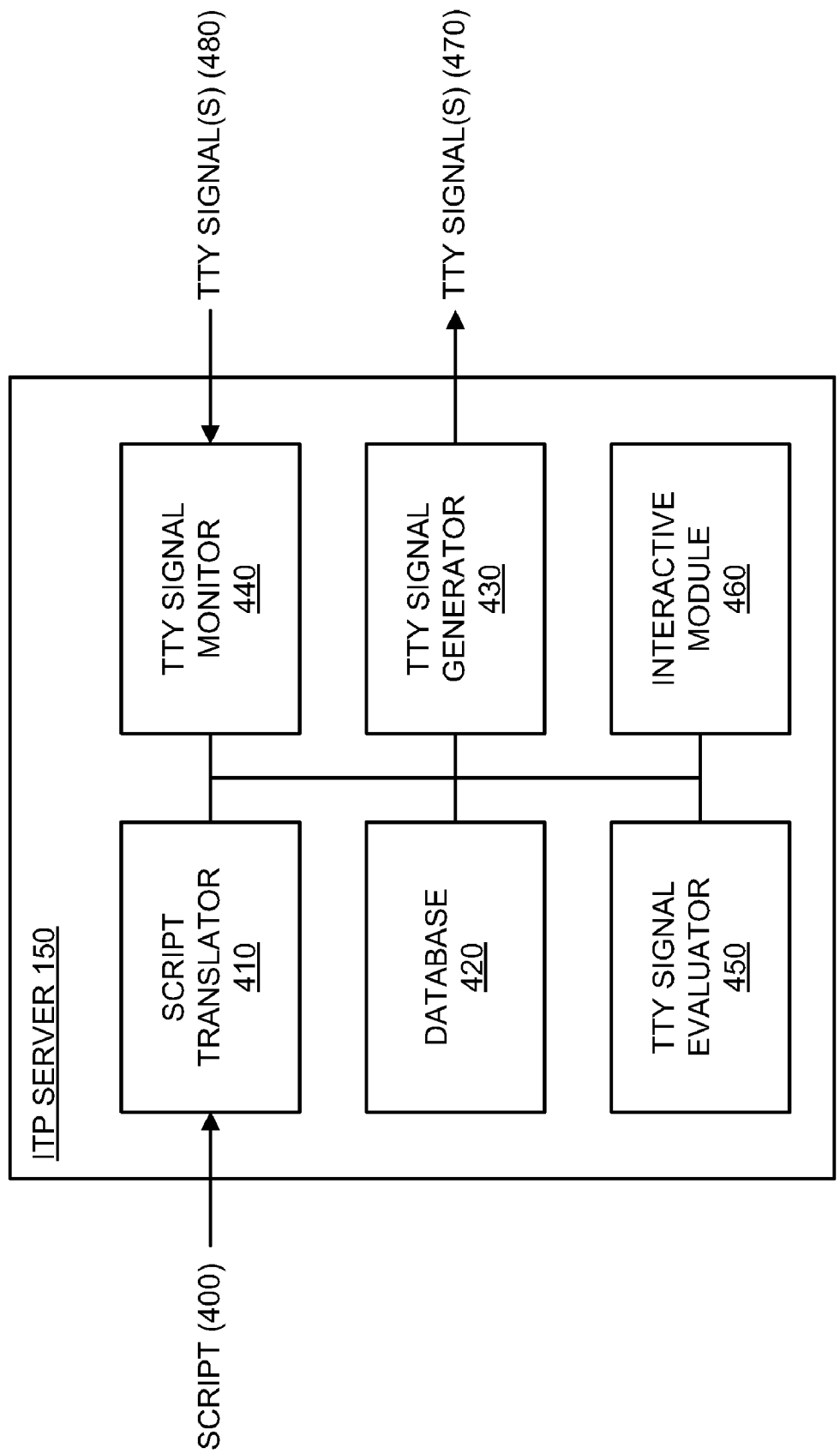
FIG. 4 is an exemplary functional diagram of an interactive testing platform (ITP) server of the exemplary network shown in FIG. 1.

FIG. 4 is an exemplary functional diagram of one such ITP server, i.e., ITP server 150 of exemplary network 100. Generally, ITP server 150 may translate script commands (e.g., Visual Basic style script commands) into TTY specific test communications, and/or may evaluate the results of the TTY-based tests. As shown, ITP server 150 may include a variety of components. For example, ITP server 150 may include a script translator 410, a database 420, a TTY signal generator 430, a TTY signal monitor 440, a TTY signal evaluator 450, an interactive module 460, etc.

Script translator 410 may receive a script command(s) 400 from the ITP system, and may translate script command(s) 400 into information capable of emulating TTY devices, such as TTY device 120. Script command(s) 400 may include commands for the creation of TTY-based test cases for, e.g., network 100. Script command(s) 400 may also define which physical devices of the network may be used, and may assign names to the physical devices. For example, script command(s) 400 may include test commands that permit ITP server 150 to generate TTY signals (e.g., via TTY signal generator 430), test commands that permit ITP server 150 to receive TTY signals (e.g., via TTY signal monitor 440), test commands that cause ITP server 150 to evaluate the received TTY signals (e.g., via TTY signal evaluator 450) and perform appropriate logic (e.g., ITP commands such as sending tone, hanging up, sending TTY characters, etc.), etc. Script command(s) 400 may also or alternatively specify a string that tells ITP server 150 (e.g., TTY signal monitor 440) what substring to look for in the incoming TTY signals.

Script translator 410 may utilize database 420 to aid in the translation of script command(s) 400. In one implementation, database 420 may correspond to main memory 230, ROM 240, storage device 250, or combinations of the aforementioned (see FIG. 2). In another implementation, database 420 may be external to ITP server 150 and may be accessed via, e.g., communication interface 280. Database 420 may provide information enabling devices of network 100 to reference specific Internet Protocol (IP) address/port combinations for communication with specific network devices (e.g., other ITP servers) being used. Database 420 may also provide a reference to voice server 130.

TTY signal generator 430 may generate TTY signal(s) 470 as set forth by the translated script command(s) 400. For example, TTY signal generator 430 may generate sound using two different frequencies to represent binary "1s" and "0s." The sounds may be generated at a predetermined rate and with different patterns (e.g., frequencies) to represent different characters in the alphabet. Depending on the test case provided by script command(s) 400, TTY signal generator 430 may send frequencies representative of characters specified by the test case. TTY signal generator 430 may also or alternatively generate TTY signal(s) 470 that include a substring to be used for testing purposes. TTY signal generator 430 may also or alternatively generate TTY signal(s) 470 capable of being sent on any type of device supported by the ITP system, e.g., analog telephone lines, T1, E1, and IP network interfaces, etc.

TTY signal monitor 440 may utilize the translated script command(s) to monitor for incoming TTY signal(s) 480, and may report TTY signal(s) 480 to other components of ITP server 150 to enable evaluation of TTY signal(s) 480. For example, TTY signal monitor 440 may look for a particular substring in TTY signal(s) 480, and may forward TTY signal(s) 480 containing the substring to TTY signal evaluator 450.

TTY signal evaluator 450 may, based on script command(s) 400, evaluate the received TTY signal(s) 480 and may perform appropriate logic based on TTY signal(s) 480. For example, TTY signal evaluator 450 may, based on the received TTY signal(s) 480, perform logic that may include any ITP command (e.g., sending a tone, hanging up (e.g., disconnecting a TTY device), sending TTY characters, etc.). In one example, the following script may cause TTY signal evaluator 450 to look for the phrase "Press any Key" in TTY signal(s) 480, may cause a failure if the phrase is not found, and/or may cause TTY generator 430 to send out the TTY key "a" if the phrase is found:

Display Message="Looking for TTY press any key"
ReceiveTTY Orig Digits="PRESS ANY KEY" Timeout=20000
if ReceiveTTY.bSuccess=false then
    Result False Message="Did not get TTY prompt"
endif
SendTTY ORIG Digits="a".

Interactive module 460 may provide an interactive mode for ITP server 150 that may permit a user of the ITP system to receive and view TTY signal(s) in real-time (e.g., via TTY signal monitor 440), may permit ITP server 150 to formulate an appropriate response based on the received TTY signal(s), and may permit ITP server 150 to send the appropriate response in real-time (e.g., via TTY signal generator 430). Interactive module 460 may thus aid in the automatic creation of script emulating a TTY device. For example, interactive module 460 may automatically create script emulating a TTY device based on the formulated response.

Although FIG. 4 shows exemplary components of ITP server 150, in other implementations, ITP server 150 may contain fewer or additional components that may permit TTY communication via a network, such as network 160. In still other implementations, one or more components of ITP server 150 may perform the tasks performed by other components of ITP server 150.

Figure 5:
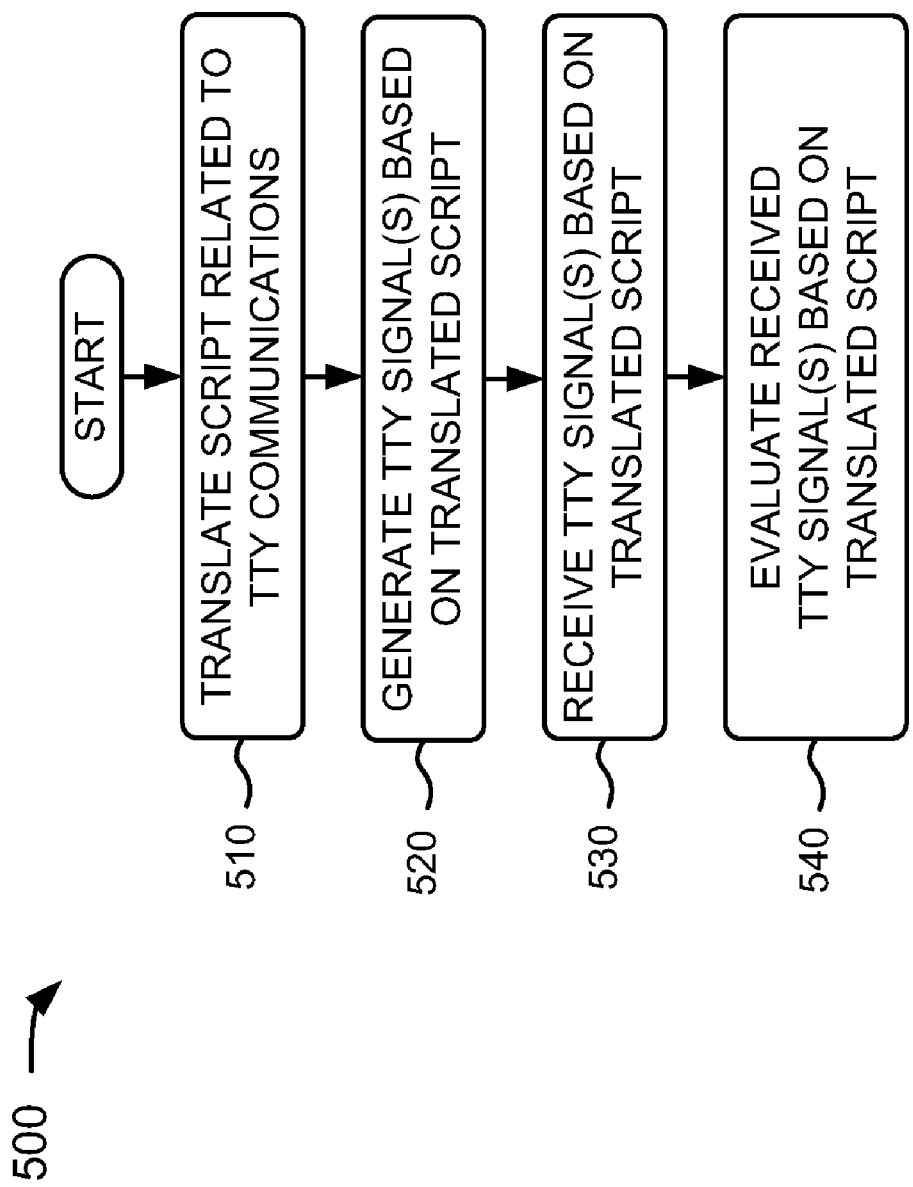
FIG. 5 is a flowchart of an exemplary process capable of being performed by the ITP server shown in FIG. 4.

FIG. 5 is a flowchart of an exemplary process 500 capable of being performed by ITP server 150. As shown, process 500 may translate script related to TTY communications (block 510). For example, in one implementation described above in connection with FIG. 4, script translator 410 may receive a script command(s) 400 from the ITP system (e.g., from a server (e.g., a script server), a communication device (e.g., an ITP client device)), and may translate script command(s) 400 into information capable of emulating TTY devices, such as TTY device 120. Script command(s) 400 may include commands for the creation of TTY-based test cases for, e.g., network 100. Script command(s) 400 may include test commands that permit ITP server 150 to generate TTY signals (e.g., via TTY signal generator 430), test commands that permit ITP server 150 to receive TTY signals (e.g., via TTY signal monitor 440), test commands that cause ITP server 150 to evaluate the received TTY signals (e.g., via TTY signal evaluator 450) and perform appropriate logic (e.g., ITP commands such as sending tone, hanging up, sending TTY digits, etc.), etc.

As further shown in FIG. 5, process 500 may generate TTY signal(s) based on the translated script (block 520). For example, in one implementation described above in connection with FIG. 4, TTY signal generator 430 may generate TTY signal(s) 470 as set forth by the translated script command(s) 400. TTY signal generator 430 may, for example, generate sound using two different frequencies to represent binary "1s" and "0s." The sounds may be generated at a predetermined rate and with different patterns (e.g., frequencies) to represent different characters in the alphabet. Depending on the test case provided by script command(s) 400, TTY signal generator 430 may send frequencies representative of characters specified by the test case. TTY signal generator 430 may also generate TTY signal(s) 470 that include a substring to be used for testing purposes. TTY signal generator 430 may further generate TTY signal(s) 470 capable of being sent on any type of device supported by the ITP system, e.g., analog telephone lines, T1, E1, and IP network interfaces, etc.

Process 500 may receive TTY signal(s) based on the translated script (block 530). For example, in one implementation described above in connection with FIG. 4, TTY signal monitor 440 may utilize the translated script command(s) to monitor for incoming TTY signal(s) 480, and may report TTY signal(s) 480 to other components of ITP server 150 to enable evaluation of TTY signal(s) 480. In one example, TTY signal monitor 440 may look for a particular substring in TTY signal(s) 480, and may forward TTY signal(s) 480 containing the substring to TTY signal evaluator 450.

As further shown in FIG. 5, process 500 may evaluate the received TTY signal(s) based on the translated script (block 540). For example, in one implementation described above in connection with FIG. 4, TTY signal evaluator 450 may, based on script command(s) 400, evaluate the received TTY signal(s) 480 and may perform appropriate logic (e.g., any ITP command, such as sending a tone, hanging up, sending TTY digits, etc.) based on TTY signal(s) 480.

Figure 6:
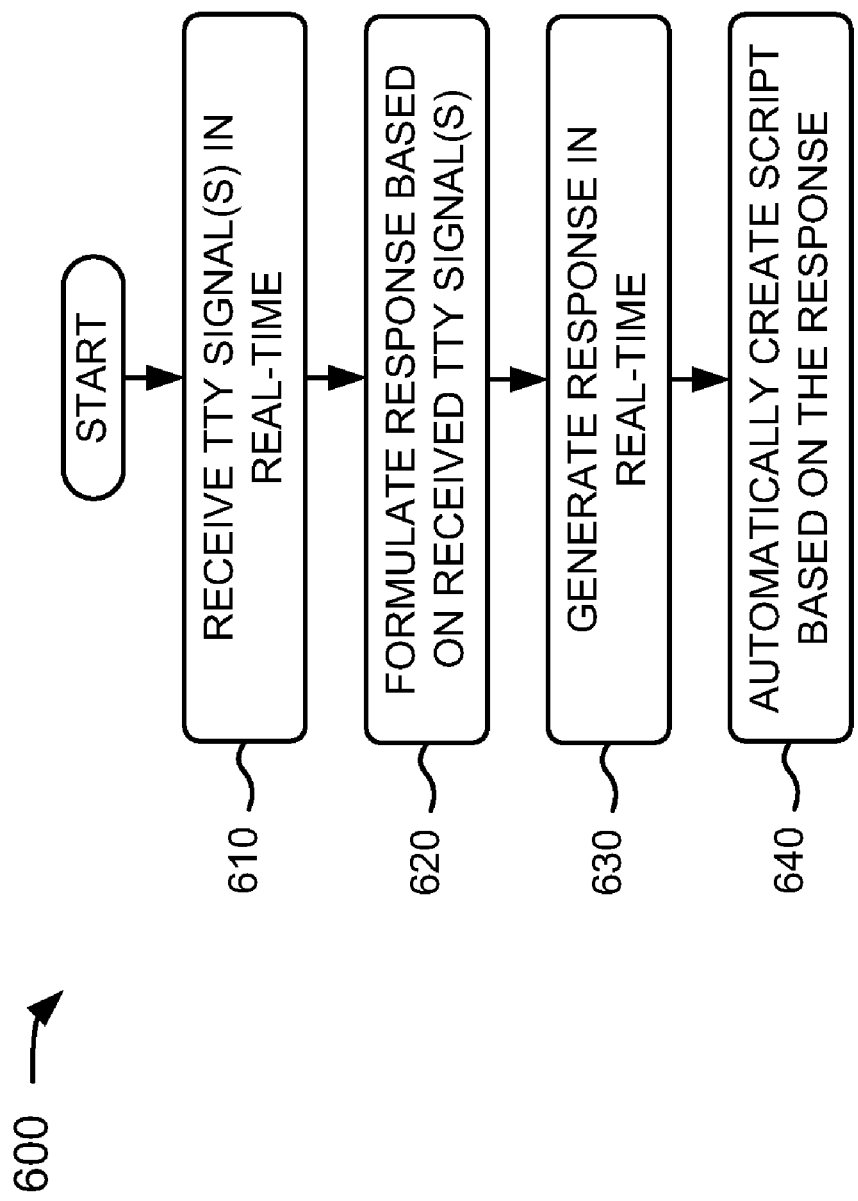
FIG. 6 is a flowchart of another exemplary process capable of being performed by the ITP server shown in FIG. 4.

FIG. 6 is a flowchart of another exemplary process 600 capable of being performed by ITP server 150. As shown, process 600 may receive TTY signal(s) in real-time (block 610). For example, in one implementation described above in connection with FIG. 4, interactive module 460 may provide an interactive mode for ITP server 150 that may permit a user of the ITP system to receive and view TTY signal(s) in real-time (e.g., via TTY signal monitor 440).

As further shown in FIG. 6, process 600 may formulate a response (e.g., to test network 100) based on the received TTY signal(s) (block 620). For example, in one implementation described above in connection with FIG. 4, interactive module 460 may permit ITP server 150 to formulate an appropriate response based on the received TTY signal(s).

Process 600 may generate the response in real-time (block 630). For example, in one implementation described above in connection with FIG. 4, interactive module 460 may permit ITP server 150 to send the appropriate response in real-time (e.g., via TTY signal generator 430).

As further shown in FIG. 6, process 600 may automatically create script based on the response (block 640). For example, in one implementation described above in connection with FIG. 4, interactive module 460 may automatically create script emulating a TTY device based on the formulated response.

Systems and methods described herein may use a mechanism emulating a TTY device to permit TTY functional testing of a network and/or devices within the network. The systems and methods may implement the mechanism within an ITP system that may test the performance of the network. The mechanism may generate sound using two different frequencies to represent binary "1s" and "0s." The sounds may be generated at a predetermined rate and with different patterns (e.g., frequencies) to represent different characters in the alphabet. The frequencies and levels of frequencies may be varied from standards to test network performance and determine failure points.

The foregoing description provides illustration and description, but is not intended to be exhaustive or to limit the embodiments to the precise form disclosed. Modifications and variations are possible in light of the above teachings or may be acquired from practice of the invention.

For example, while series of acts have been described with regard to the flowcharts of FIGS. 5 and 6, the order of the acts may differ in other implementations consistent with the embodiments described herein. Further, non-dependent acts may be performed in parallel.

Embodiments, as described above, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
  obtaining, at a server device and via a network, a script command related to teletype (TTY) communications in the network, where the script command includes instructions to:
    emulate a TTY device on the network, the TTY device including a telecommunications device for the deaf (TDD), define a TTY test case, and
identify one or more other network devices in the network to be accessed, by the server device and in real-time, to implement the TTY test case;
translating, via the server device, the script command to access the instructions;
implementing, via the server device, the script command to test the network using the TTY test case, including accessing the one or more other network devices, and emulating, via the server device and on the network, the TTY device, where emulating the TTY device includes one or more of generating or receiving a TTY signal based on the translated script command; and
storing, via the server device, one or more results from implementing the script command.

2. The method of claim 1, where emulating the TTY device includes receiving the TTY signal, and where the method further comprises:
evaluating the received TTY signal based on the translated script command.

3. The method of claim 2, where the evaluating the received TTY signal comprises performing one or more actions based on the received TTY signal.

4. The method of claim 3, where performing the one or more actions comprises at least one of:
sending a tone;
disconnecting a TTY device of the network; or
sending TTY characters.

5. The method of claim 2, where the script command further specifies a substring to look for in the received TTY signal.

6. The method of claim 2, where evaluating the received TTY signal comprises at least one of:
reporting, to another network device, the received TTY signal to enable evaluation of the received TTY signal by the other network device; or
determining whether the received TTY signal contains a particular substring.

7. The method of claim 1, where emulating the TTY device includes generating the TTY signal, and where generating the TTY signal comprises at least one of:
generating a frequency representative of a character;
generating a TTY signal that includes a substring to be used for testing purposes; or
generating a TTY signal capable of being sent on any type of device supported by the network.

8. The method of claim 1, further comprising:
forwarding, via the server device and to another network device, at least one message related to a status of at least one of the obtaining, the translating, the implementing, or the storing.

9. A device comprising:
a script translator to translate a script command related to teletype (TTY) communications in a network, where the script command includes instructions to:
emulate a TTY device on the network, the TTY device including a telecommunications device for the deaf (TDD),
define a TTY test case, and
identify one or more other network devices in the network to be accessed, by the server device and in real-time, to implement the TTY test case; and
a TTY signal generator to emulate, on the network, the TTY device, where the TTY signal generator, when emulating the TTY device, is further to:
access the one or more other network devices, and
generate a TTY signal based on the translated script command and on the TTY test case to test the network.

10. The device of claim 9, where the script command specifies a substring to be included in the TTY signal and where the substring is used for testing purposes.

11. The device of claim 9, where the TTY signal generator is further to generate at least one of:
a frequency representative of a character;
a TTY signal that includes a substring to be used for testing purposes; or
a TTY signal capable of being sent on any type of device supported by the network.

12. The device of claim 9, further comprising:
a TTY signal monitor to receive, based on the translated script command, a TTY signal, where the received TTY signal is evaluated to test the network.

13. The device of claim 12, where the TTY signal monitor is further to, at least one of:
report, to another device, the received TTY signal to enable an evaluation of the received TTY signal; or
determine when the received TTY signal contains a substring.

14. The device of claim 12 further comprising:
a TTY signal evaluator to evaluate the received TTY signal based on the translated script command.

15. The device of claim 14, where, based on the received TTY signal, the TTY signal evaluator is further to, at least one of:
send a tone;
disconnect a TTY device of the network; or
send TTY characters.

16. The device of claim 9, further comprising:
an interactive module to:
receive a TTY signal in real-time,
formulate a response to test the network based on the received TTY signal,
send the response in real-time to the network, and
create, automatically, script to emulate another TTY device of the network based on the response.

17. The device of claim 9, further comprising:
a processor to forward, to another device, at least one message related to a status of at least one of the script translator or the TTY signal generator.

18. A method comprising:
receiving, at a server device, a teletype (TTY) signal from a network in real-time;
formulating, via the server device, a response to test the network based on the received TTY signal, where formulating the response includes:
defining a TTY test case, and
accessing, by the server device and in real-time, one or more other network devices in the network to implement the TTY test case;
emulating, via the server device, a TTY device on the network, the TTY device including a telecommunications device for the deaf (TDD), where emulating the TTY device includes sending the response in real-time to the network; and
storing, via the server device, one or more results from emulating the TTY device.

19. The method of claim 18, further comprising:
forwarding, via the server device and to another network device, at least one message related to a status of at least one of the receiving, the formulating, the emulating, or the storing.

20. A system comprising:

a memory to store a plurality of instructions; and
a processor to execute instructions in the memory to:
- receive a teletype (TTY) signal from a network in real-time,
- formulate a response to test the network based on the received TTY signal, where the processor, when to executing the instructions in the memory to formulate the response, is further to:
- define a TTY test case, and
- access one or more other network devices in the network to implement the TTY test case, and emulate a TTY device on the network, the TTY device including a telecommunications device for the deaf (TDD), where the processor, when emulating the TTY device, is further to send the response in real-time to the network.

21. The system of claim 20, where the processor further executes instructions in the memory to:
- translate a script command related to TTY communications in the network; and
- generate or receive a TTY signal based on the translated script command to test the network.

22. The system of claim 21, where the processor further executes instructions in the memory to:
- evaluate a received TTY signal based on the translated script command.

23. The system of claim 20, where the processor is further to execute instructions in the memory to:
- forward, to another network device, at least one message related to a status of at least one of the receiving, the formulating, or the emulating.

\* \* \* \* \*